Dec. 18, 1923.
B. H. BLOOD
GAUGE
Filed May 28, 1920
1,477,533
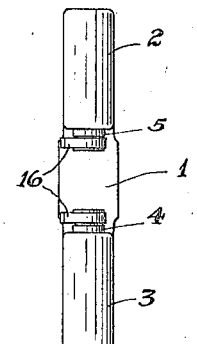
Fig. 2.
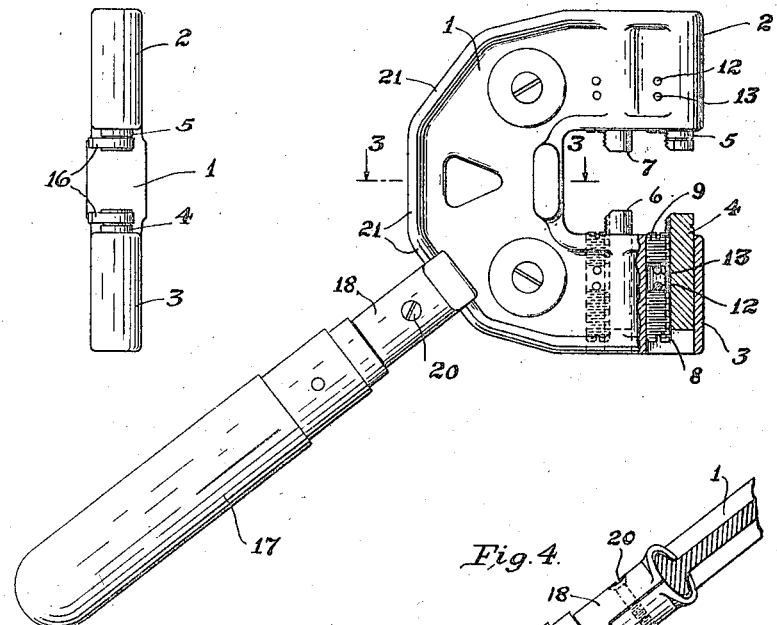
Fig. 1.
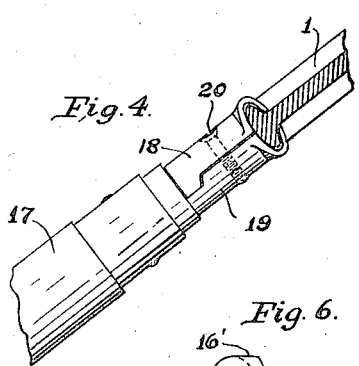
Fig. 4.
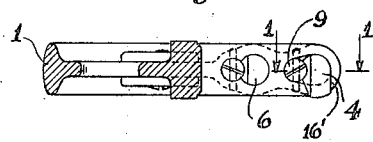
Fig. 3.
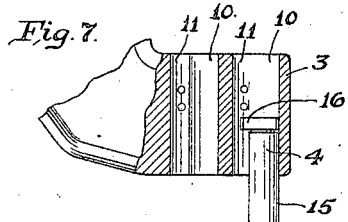
Fig. 7.
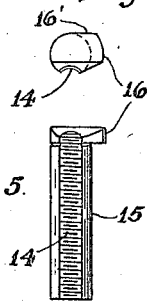
Fig. 6.
Fig. 5.
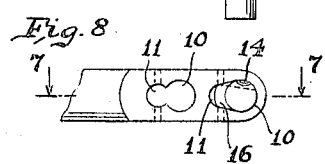
Fig. 8.
Inventor
Bryant H. Blood.
By S. Jay Teller
Attorney Patented Dec. 18, 1923.

1,477,533

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

GAUGE.

Application filed May 28, 1920. Serial No. 384,924.

*To all whom it may concern:*

Be it known that I, BRYANT H. BLOOD, a citizen of the United States, residing at Hartford, in the county of Hartford and State of Connecticut, have invented certain new and useful Improvements in Gauges, of which the following is a specification.

This invention relates to gauges and is particularly applicable to gauges of the opposed contact type, especially limit gauges having two or more pairs of opposed contacts or anvils. For performing certain gaging operations with this type of gauge it is desirable and often essential that the gauge anvils be provided with projecting gaging heads. It is an object of this invention to provide such a gauge wherein gaging heads of a novel form project laterally of the gauge for the purpose stated. Also in the smaller sizes of such gauges, the distance between the opposed arms of the gauge is so small that the anvils cannot be assembled in the usual manner from the center outwardly. It is accordingly another object of this invention to form the gaging heads of such shape relative to the openings within the gauge frame that the anvils may be assembled from the outside of the gauge inwardly, the heads passing through such openings.

Other and more specific objects of the invention will appear as the description proceeds.

Referring to the figures of the drawing:

Figure 1 is a side elevation of the gauge and its handle showing one of the gauge anvils and its adjusting mechanism in section, such section being taken on the line 1—1 of Fig. 3.

Fig. 2 is a front edge view of the gauge.

Fig. 3 is a sectional view of the gauge taken on the line 3—3 of Fig. 1.

Fig. 4 is a fragmentary detail view showing how the gauge handle is secured to the gauge.

Fig. 5 is an enlarged elevation of one of the gauge anvils.

Fig. 6 is an end view thereof showing the gaging head thereon.

Figs. 7 and 8 are fragmentary detail views illustrating the initial assembling of the anvils in the gauge frame, the former being in section taken on the line 7—7 of Fig. 8.

This invention relates to a gauge particularly of the type illustrated in my copending application Serial No. 353,379, filed Jan. 22, 1920, the present invention however relating particularly to the anvils or contact members and the gaging heads thereon and the manner of assembling the same in small gauges.

In the drawing, 1 represents the main frame or body of the gauge and, as illustrated, this gauge body is, in general, U-shaped in form and comprises opposite arms 2 and 3. A pair of opposed contact members or anvils is mounted respectively in the arms 2 and 3, and by preference there are a plurality of pairs of such members, thus adapting the gauge for use as a limit gauge. As illustrated, there are two pairs of opposed anvils 4 and 5 and 6 and 7 respectively. At least one member of each pair is adjustable, and preferably, as shown, both anvils are adjustable. I have illustrated the anvils 4 and 5 as provided with laterally projecting gaging heads which extend beyond the gauge frame and are therefore free from interference by the frame with the work when taking a close measurement such as a measurement directly adjacent a shoulder. Also I have illustrated the anvils 4 and 5 as each being provided with a gaging head projecting laterally to one side only of the gauge, this construction being particularly applicable to the gauge shown as will hereinafter appear.

Each of the anvils, as for instance 4, is lineally movable, and there are two independent adjusting devices, as in the gauge disclosed in the aforesaid application, which engage each anvil and which act in opposite directions thereon to adjust and lock it in adjusted position. Preferably, as shown these adjusting devices are in the form of screws 8 and 9. In the preferred embodiment of the invention these screws are held against longitudinal movement and have threaded engagement directly with the anvil. The two adjusting screws, together with the major portion of the anvil, are positioned within an opening in the gauge body. In order to provide a simple and compact construction, this opening consists of two intersecting bores 10 and 11, one adapted to receive and fit the shank of the anvil, and the other adapted to receive and fit the exteriors of the screws 8 and 9. Inasmuch as the two bores intersect, a sector of the shank is concaved and is threaded at 14 along the concaved portion so as to be adapted to be engaged by the screws, whereby the anvil is held from rotation within the gauge and may be adjusted longitudinally and locked in adjusted position. Two separate pins 12 and 13 extending through transverse holes in the gauge body are adapted to serve respectively as abutments for the screws 8 and 9. It will be seen that when the screws are tightened they bear against their respective pins 12 and 13 and act in opposite directions on the anvil, thus securely locking it against lineal movement. If it is desired to adjust the anvil inward, the screw 8 is first loosened and the screw 9 then screwed inward the effect of which is to draw the anvil out of the bore. When properly adjusted the anvil may be locked by tightening the screw 8. If it is desired to move the anvil outward, the screw 9 is first loosened and the screw 8 screwed inward, the general operation being the same as above described.

The anvil illustrated in Figs. 5 and 6 preferably comprises a shank 15 and a flanged end forming the head 16. I form this head of an oblong shape preferably extending from one side only of the shank, such construction being necessary in small gauges as will hereinafter appear. One of the long edges 16' of the head is preferably formed as a straight edge adapted to be used as a gaging surface.

I preferably form the front pair of anvils 4 and 5 with the projecting heads 16 above referred to and the rear pair of anvils 6 and 7 with plain gaging surfaces. In the smaller sized gauges, as the one illustrated, the anvils, being longer than the distance between the gaging arms 2 and 3, must be assembled in the gauge from the outside inwardly. The plain anvils 6 and 7 may very easily be assembled in such manner, however special provision must be made for assembling the headed anvils 4 and 5. Therefore in order to overcome this difficulty without sacrificing any of the advantages of the gauge, I have constructed the gaging head 16 of such shape relative to its opening in the gauge frame that the anvils may be readily assembled therein even in the smallest type of gauge. As will be noted by reference to Figs. 7 and 8, in the forward anvil openings I cut away the corners formed by the intersections of the bores 10 and 11 in such manner as to provide sufficient space to allow the head 16 to extend into the bore 11 (Fig. 8). The position of the gaging head and anvil within the gauge frame during the assembling operation is illustrated in these figures, wherein the head is shown as being inserted inwardly through the adjusting screw openings formed in the gauge. When the head has passed entirely through the opening to a position between the arms 2 and 3, the head is turned to its lateral position with the screw threads 14 opposite the adjusting screw opening, the pins 12 and 13 are set in place, and the adjusting screws are inserted to hold the anvils in position. It will be noted that the threads 14 for the adjusting screws are formed along the body portion of the anvil, and in order that the gaging heads may extend laterally of the gauge, I form these screw threads approximately at right angles to the head 16 on the shank. In the assembled position, as seen in Fig. 3, the straight edges 16' of the gaging heads extend tranversely of the gauge frame in such maner as to adapt such edges to be readily used as gaging elements. It will be noted that each such edge 16' is formed at the apex or meeting line of the front and end surfaces of the head 16. It will furthermore be noted that the edge 16' of one anvil 4 is directly opposite such edge on the anvil 5 whereby such edges cooperate to form opposed gaging elements. Also, as heretofore stated, the free outer ends of the heads 16 extend laterally of the gauge beyond the gauge frame whereby such ends may be used to make a measurement which cannot well be reached by the front edges 16' of the heads.

It will be seen that a gauge constructed as herein shown and described can be readily adjusted for work of different dimensions. When two pairs of contacts are provided, as shown, the gauge can be used as a "go" and "no go" limit gauge, and the contacts can be readily changed for different tolerances. After the gauge has been adjusted in the tool room it can be sealed by placing sealing wax in the several bores 10 and 11.

In Figs. 1 and 4, I have illustrated the gauge as provided with a novel form of handle which though not a part of the present invention and not claimed herein is particularly adapted for use with a gauge of this type. This handle preferably comprises a hand hold 17 of wood or other heat insulating material and a pair of gauge clamps 18 and 19 secured together by a screw 20. As will be noted the clamp 18 is removable from the clamp 19 which is socketed in the handle. It will further be noted that the handle may be secured to any one of the straight sides 21 of the gauge frame in such manner as to hold the gauge in any position desired. The handle illustrated not only provides a convenient means for holding the small gauge but also provides a heat insulating means whereby the operator's hand never comes into contact with the gauge frame.

The general construction described and illustrated herein constitutes a gauge wherein the objects sought are fully attained in a very simple and substantial manner, and while the drawing illustrates only one practical application of the invention, it should be understood that the same is capable of other applications and may be embodied in other forms.

What I claim is:

1. A gauge anvil comprising a shank having a laterally projecting gaging head integral on one end and screw threads extending along one side of the body portion thereof, the edge of the head diametrically opposite the screw threads extending in a straight line adapted to serve as a gaging surface.

2. A gauge anvil comprising a shank having a laterally projecting gaging head on one end and screw threads extending along one side of the body portion thereof, the head and threads being so arranged on the shank that lines radial of the shank and passing through the threaded portion and longitudinally of the gaging head respectively will be approximately at right angles.

3. A gauge having a pair of anvils mounted in axial alinement therein, each anvil comprising a shank having an oblong gaging head thereon extending substantially radially of the shank and transversely of the gauge frame, the forward long edge of each head extending in a straight line adapted to serve as a gaging surface.

4. A gauge having a pair of anvils mounted in axial alignment therein, each anvil comprising a shank having an oblong gaging head thereon extending substantially radially of the shank, transversely and to one side only of the gauge frame, the forward long edge of the head extending in a straight line adapted to serve as a gaging surface.

5. A gauge having an opening therein, an anvil mounted to slide lineally in the opening, and an anvil adjusting means also mounted in the opening, the anvil being provided on one end with a laterally projecting gaging head of such size and shape as to pass through the said opening in assembling the gauge.

6. A gauge having an oblong opening therein, an anvil mounted to slide lineally in one portion of the opening, and an anvil adjusting means mounted in another portion of the opening, the anvil being provided on one end with a laterally projecting gaging head of such size and shape as to pass through the second mentioned portion of the opening in assembling the gauge.

7. A gauge having an oblong opening therein, an anvil mounted to slide lineally in one portion of the opening, and an anvil adjusting means mounted in another portion of the opening, the anvil being provided on one end with a laterally projecting gaging head of such size and shape as to pass through the second mentioned portion of the opening in assembling the gauge, the said head in its assembled position extending in a general direction approximately at right angles to the second mentioned portion of the opening.

8. A gauge having an opening therein, an anvil mounted to slide lineally in the opening and an anvil adjusting screw also mounted in the opening and engaging the anvil, the anvil being provided on one end with a laterally projecting gaging head of such size and shape as to pass through the said opening in assembling the gauge.

9. A gauge comprising a U-shaped frame providing a pair of gauge arms, and a gaging anvil mounted in each arm, each arm having an opening therein in which its anvil is seated, each anvil being provided with an oblong gaging head integral thereon and one of the said openings being of a size and shape permitting the passage therethrough of an anvil and its head in the assembling operation.

10. A gauge comprising a U-shaped frame providing a pair of gauge arms, and a gaging anvil mounted in each arm, each anvil being provided with an oblong gaging head integral thereon, each gaging head extending substantially radially of the shank and transversely of the gauge frame and the forward long edge of each head extending in a straight line adapted to serve as a gaging surface.

11. A limit gauge comprising a U-shaped frame providing a pair of gauge arms, a plurality of pairs of anvils mounted in the arms, the forward pair of anvils each being provided with an oblong gaging head thereon extending substantially radially of the shank and transversely of the gauge frame and the forward long edge of each head extending in a straight line adapted to serve as a gaging surface.

12. A gauge having an opening therein, an anvil mounted to slide lineally in the opening, and an anvil adjusting screw also mounted in the opening and threadedly engaging the anvil, the anvil being provided on one end with a laterally projecting gaging head of such size and shape as to pass through the said opening in assembling the gauge, the said head in its assembled position extending in a general direction approximately at right angles to the threaded portion of the anvil and its adjusting screw.

13. A gauge comprising a U-shaped frame providing a pair of gauge arms, two opposed anvils and their adjusting means mounted in openings respectively in the said arms, each anvil comprising a shank and a radially extending gaging head thereon of such size and shape as to pass through the said opening in assembling the gauge.

14. A gauge comprising a U-shaped frame providing a pair of gauge arms, two opposed anvils mounted respectively in the said arms, each anvil comprising a shank and a radially extending gaging head thereon, each shank being adapted to slide lineally in one portion of an oblong opening in its respective arm, and an anvil adjusting means mounted in another portion of the opening, the anvil gaging head being of such size and shape as to pass through the second mentioned portion of the opening in assembling the gauge.

15. A gauge comprising a U-shaped frame providing a pair of gauge arms, two opposed anvils mounted respectively in the said arms, each anvil comprising a shank and a radially extending gaging head thereon, each shank being adapted to slide lineally in one portion of an oblong opening in its respective arm, the anvil gaging head being of such size and shape as to pass through another portion of the opening in assembling the gauge and adapted thereafter to be rotated to place the gaging head in the desired position, and means in the second mentioned portion of the opening for adjusting and securing the anvil in position.

In testimony whereof, I hereto affix my signature.

BRYANT H. BLOOD.